United States Patent
Wilsher (10) Patent No.: US 9,143,629 B2
(45) Date of Patent: Sep. 22, 2015

(54) SYSTEMS AND METHODS FOR STREAK DETECTION IN IMAGE ARRAY SCANNING

(71) Applicant: XEROX Corporation, Norwalk, CT (US)

(72) Inventor: Mike Wilsher, Letchworth (GB)

(73) Assignee: Xerox Corporation, Norwalk, CT (US)

( * ) Notice: Subject to any disclaimer, the term of this patent is extended or adjusted under 35 U.S.C. 154(b) by 103 days.

(21) Appl. No.: 13/721,518

(22) Filed: Dec. 20, 2012

(65) Prior Publication Data

US 2014/0177016 A1 Jun. 26, 2014

(51) Int. Cl.
- H04N 1/46 (2006.01)
- H04N 1/04 (2006.01)
- G06K 9/00 (2006.01)
- H04N 1/00 (2006.01)

(52) U.S. Cl.
CPC ....... *H04N 1/00045* (2013.01); *H04N 1/00005* (2013.01); *H04N 1/0005* (2013.01); *H04N 1/00037* (2013.01); *H04N 1/00087* (2013.01)

(58) Field of Classification Search
None
See application file for complete search history.

(56) References Cited

U.S. PATENT DOCUMENTS

| | | | | |
|---|---|---|---|---|
| 4,575,124 A | * | 3/1986 | Morrison | 283/115 |
| 5,031,225 A | * | 7/1991 | Tachikawa et al. | 382/185 |
| 5,077,811 A | * | 12/1991 | Onda | 382/290 |
| 5,513,017 A | * | 4/1996 | Knodt et al. | 358/471 |
| 5,600,574 A | * | 2/1997 | Reitan | 702/185 |
| 5,915,150 A | * | 6/1999 | Kukimoto et al. | 399/149 |
| 6,393,161 B1 | | 5/2002 | Stevenson et al. | |
| 6,431,679 B1 | * | 8/2002 | Li et al. | 347/19 |
| 6,522,431 B1 | | 2/2003 | Pitts et al. | |
| 6,657,739 B1 | * | 12/2003 | Grant et al. | 358/1.12 |
| 7,055,925 B2 | * | 6/2006 | Subirada et al. | 347/19 |
| 7,085,003 B1 | * | 8/2006 | Belkhir | 358/1.9 |
| 7,773,774 B2 | * | 8/2010 | Rasmussen et al. | 382/112 |
| 8,406,570 B2 | * | 3/2013 | Morimoto et al. | 382/296 |
| 8,422,104 B2 | * | 4/2013 | Matsuda | 358/527 |
| 8,913,285 B1 | * | 12/2014 | Neubrand | 358/1.9 |
| 2002/0126899 A1 | * | 9/2002 | Farrell | 382/199 |
| 2002/0171709 A1 | * | 11/2002 | Teshigawara et al. | 347/43 |
| 2003/0098985 A1 | * | 5/2003 | Horobin | 358/1.9 |
| 2003/0142985 A1 | * | 7/2003 | Sampath et al. | 399/9 |
| 2004/0036725 A1 | * | 2/2004 | Ikeda et al. | 347/11 |
| 2004/0066426 A1 | * | 4/2004 | Yamada | 347/19 |
| 2005/0151767 A1 | * | 7/2005 | Yeh et al. | 347/9 |
| 2005/0219590 A1 | * | 10/2005 | Andersen et al. | 358/1.12 |
| 2005/0286742 A1 | * | 12/2005 | Rasmussen et al. | 382/112 |
| 2006/0244776 A1 | * | 11/2006 | Mizes | 347/19 |
| 2007/0007432 A1 | * | 1/2007 | Tatarczyk et al. | 250/208.1 |

(Continued)

*Primary Examiner* — Madelein Nguyen
(74) *Attorney, Agent, or Firm* — Ronald E. Prass, Jr.; Prass LLP (57) ABSTRACT

A system and method are provided for streak detection in an image scanning system. The disclosed systems and methods may be particularly applicable to constant velocity transport (CVT) digital scanning systems by comparing multiple scans of a simply-produced test pattern passed over the sensor in multiple orientations. Image information from each pass of the test pattern through the image scanning system may be compared to image information from other passes in which the orientation of the test pattern is changes. The data may be normalized and compared to discern image quality defects introduced by the image scanning system including image defects presented in the form of streaks in an output image based on the scanned data. Cumulative data regarding detected image defects and defect correction measures applied in the image scanning system may be collected and stored for a user to access.

18 Claims, 6 Drawing Sheets

(56) References Cited

U.S. PATENT DOCUMENTS

| | | | |
|---|---|---|---|
| 2007/0247681 A1* | 10/2007 | Klassen | 358/532 |
| 2008/0113282 A1* | 5/2008 | Andoh et al. | 430/7 |
| 2008/0137143 A1* | 6/2008 | Mizes | 358/3.01 |
| 2008/0225098 A1* | 9/2008 | Hagiwara et al. | 347/101 |
| 2008/0253607 A1* | 10/2008 | Miyamoto et al. | 382/100 |
| 2009/0015612 A1* | 1/2009 | Teshigawara et al. | 347/12 |
| 2009/0121162 A1* | 5/2009 | Mizes et al. | 250/559.1 |
| 2009/0185813 A1* | 7/2009 | Hagiwara et al. | 399/16 |
| 2009/0207435 A1* | 8/2009 | Megawa et al. | 358/1.15 |
| 2010/0047000 A1* | 2/2010 | Park et al. | 399/394 |
| 2010/0121737 A1* | 5/2010 | Yoshida | 705/27 |
| 2010/0177365 A1* | 7/2010 | Chung et al. | 358/504 |
| 2011/0075199 A1* | 3/2011 | Jung et al. | 358/1.15 |
| 2011/0200346 A1* | 8/2011 | Hosier | 399/49 |
| 2011/0205604 A1* | 8/2011 | Imaizumi et al. | 358/498 |
| 2011/0273610 A1* | 11/2011 | Tay | 348/345 |
| 2012/0013935 A1* | 1/2012 | Adachi | 358/1.14 |
| 2012/0114396 A1* | 5/2012 | Arimura | 399/301 |
| 2012/0214590 A1* | 8/2012 | Newhouse et al. | 463/31 |
| 2012/0250108 A1* | 10/2012 | Wilsher et al. | 358/475 |
| 2012/0307325 A1* | 12/2012 | Tagawa | 358/518 |
| 2013/0027421 A1* | 1/2013 | Bala et al. | 345/594 |
| 2013/0050784 A1* | 2/2013 | Yamamoto | 358/505 |
| 2013/0070277 A1* | 3/2013 | Hoover et al. | 358/1.14 |
| 2013/0083232 A1* | 4/2013 | Tay | 348/357 |
| 2014/0368846 A1* | 12/2014 | Hadas et al. | 358/1.9 |

* cited by examiner

SYSTEMS AND METHODS FOR STREAK DETECTION IN IMAGE ARRAY SCANNING

BACKGROUND

1. Field of Disclosed Subject Matter

This disclosure relates to systems and methods for implementing a simple scheme of intelligent streak detection in constant velocity transport (CVT) image array scanning devices.

2. Related Art

A variety of systems and methods are conventionally used in digital scanning. Typical scanning systems employ full width imaging arrays that are stationary with respect to the devices in which they are housed, or which are caused to move relative to a stationary substrate to be scanned. In such systems, constant or variable rate movement is effected between the image to be scanned and the imaging array. The imaging array takes a rapidly sequential series of pictures of the image medium that is presented to be scanned as the relative movement is effected. The scanning system then digitizes the scanned image for storage and/or reproduction.

Typical full width imaging arrays include one or more rows of individually-pixilated sensors, each discrete pixel sensor being disposed to take the rapidly sequential series of digital images of the column of the scanned image which is presented within that pixel sensor's field of view.

A difficulty in such systems where the imaging point is stationary and the paper is moved past the sensor is that any imperfection in the field of view of the imaging array over a single pixel sensor or over a group of pixel sensors is repeatedly scanned and digitized as a dark or light spot in the scanned image. Relatedly, a defective sensor at a given pixel sensor location, in its failure to be able to scan image data to be digitized, will likewise potentially be digitized as a dark or light spot. The result is that the reproduced output image from the device can include a streak or line corresponding with the position of the imperfection or the defective sensor as the image of the dark spot is repeatedly reproduced to form the streak or line. Unlike a single pixel in the image being affected when the sensor array moves across a stationary image giving just a single or small group defect, a streak or line across the entire image is much more visible and objectionable.

Various exemplary scanning devices employ stationary what those of skill in the art recognize as Full-Width Imager Arrays (FWA) or linear Charge-Coupled Device (CCD) arrays. In such systems in which the imaging arrays are stationary, the arrays are often separated from the image medium or substrate to be scanned by a platen glass, or other transparent surface or lens, overlying the imaging array. Various exemplary methods are employed in these devices to move the image medium or substrate to be scanned across the transparent surface. One such exemplary method, commonly referred to as constant velocity transport (CVT) scanning, employs a belt, drum or other like device to move the image medium or substrate to be scanned across a linear sensor, such as, for example, an imaging array of individually pixilated sensors, and FWA or a CCD array.

As briefly discussed above, these imaging array scanning systems, including, for example, CVT scanning devices, may experience difficulties when dirt particles, stray paper fibers, contaminants, imperfections, obstructions and/or other objects, generally referred to throughout this disclosure as "obstructions," appear on the transparent surface, or otherwise in the field of view of the imaging arrays. Such obstructions remaining stationary on the transparent surface, or otherwise in the field of view over the imaging array sensors, are repeatedly imaged and digitized as though it were part of the scanned image. The result is that the image reproduced by the exemplary CVT scanning device will include a streak or a line on the output image.

A variety of systems and methods are employed to ensure that a platen glass or other overlying transparent surface is kept free of obstructions. These systems and methods are directed to improving reproduced image quality by keeping the transparent surface obstruction free. Often the methods are manual, requiring visual inspection, and manual cleaning, of an exemplary system's platen glass or transparent surface. These methods can be mechanically automated in that a wiper blade, or the like, may be employed to routinely, automatically "wipe down" the platen glass or transparent surface. While limitedly effective in removing surface contaminants from a transparent surface, none of these methods account for obstructions or imperfections actually on an individual sensor, or for the potential of a defective sensor, providing the same sort of false scanned image data as an obstruction in the field of view of the array would produce on the overlying transparent surface. Also, obstructions can be on the underside of the glass or other hard to clean areas.

Other systems and methods for improving reproduced output image quality include automated system steps that review the reproduced output image in comparison with the scanned image in order to detect, and optionally compensate for, differences before the reproduced image is ultimately displayed, or transferred to an image receiving substrate for output. One complication with such an approach is that it is difficult to determine whether a line, which is digitized and reproduced as part of the output image, is actually part of the image that was scanned or whether it was produced because the imaging array repeatedly scanned an imperfection stationary in its field of view, or otherwise input false or non-image data from one or a series of defective sensors, and then reproduced the non-image data as a line or streak in the reproduced image.

Difficulties in detecting obstructions are particularly acute as elements of foreign matter which commonly produce streaks in conventional and exemplary CVT scanning systems are extremely small. Any "deposited" obstruction on the platen glass large enough to be detected by simple visual inspection is, most often, large enough to be picked up by the scanned image medium as the scanned image medium is moved across the platen glass or other overlying transparent surface. The obstruction is moved out of the way as being swept away with the movement of the image medium being scanned. Obstructions that are very small, on the other hand, have a greater tendency to adhere to the transparent surface and to resist being swept away by the movement of the scanned image medium.

Among other systems and methods employed to remove streaks from digital images produced in CVT scanning systems, software algorithms exist that review stored image data representing the scanned image in its entirety. Such software algorithms apply image data revisions before reproducing a digitally scanned image in an output display device. A disadvantage in such methods is that full scanned image review algorithms require the scanning of the entire image and storage of the data representing the entire scanned image before reviewing the data and applying necessary image data revisions. In high speed scanning applications, this requirement to record an entire image and then review and revise that image before reproducing the image has the potential to slow the scanning and reproduction process to an unacceptable level.

Despite the processing overhead, such systems are available. U.S. Pat. Nos. 6,393,161 and 6,522,431 describe variations in software systems for minimizing image defects in a hard-copy input scanner. These patents, which are commonly assigned to the Assignee of this application, commonly disclose scanners in which an image-bearing sheet is moved over a relatively narrow window, through which the image is recorded by a photosensitive chip. The patents specify the problem as involving conditions when "a spot of dirt attaches to the window, a streak results in the image data." See Abstracts. In one instance, this streaking problem is addressed by detecting image data consistent with such a streak, and applying a suitable correction algorithm to the image data. The suitable correction algorithm is described as being chosen based on the thickness of the streak and the nature of the image data. In another instance, the streaking problem is addressed by having the scan line viewed by the photosensitive chip move a small distance within the window of the document handler, so that any spot on the window will not be repeatedly exposed by the photosensitive chip.

Separately, U.S. Pat. No. 7,528,997 discloses various methods for detecting streaks, such as streaks caused by imperfections in scanning systems that employ linear imaging arrays where the scanned image is sampled a minimum of two times by separate positionally discrete rows or sets of sensors in the imaging array. The at least two samples, though very close together, correspond to separate discrete linear scan locations. The scanned image data obtained from each of the two discrete rows is then normalized to adjust for different filtering capabilities, particularly color filtering in multi-spectral imaging arrays, in the discrete rows of the imaging array. The normalized scanned input image data from at least two discrete rows is then compared on a one-for-one basis in an attempt to detect imperfections overlying one or more rows of sensors in the imaging array.

U.S. Pat. No. 7,359,093 discloses systems and methods for streak detection in image array scanning using overdetermined scanners and column filtering. This streak detection method and system in a fixed imaging array digital scanning system obtains image data from each of the plurality of rows in the at least one full color spectrum channel set of rows of positionally discrete sensors and integrates this data to produce an estimate of image data recorded by at least one clear channel row of positionally discrete sensors. A clear channel error signal is generated by the comparison to alert the operator to the presence of non-image data. The clear channel error signal may be refined to through a low pass column filtering process in order to filter out potentially erroneous clear channel error resulting from thermal, mechanical or other noise sources unrelated to image scanning Stationary obstructions in the field of view of the imaging array, or defects in one or more sensors in the imaging array, are detected through this comparison which would otherwise appear repeatedly reproduced as streaks or lines in the reproduced output image.

Common to each of the above four patented methods of streak detection, isolation and/or correction are the complexity, computing overhead, additional expense, processing time and potential to miss the obstruction or defect.

SUMMARY OF THE DISCLOSED EMBODIMENTS

As discussed in detail above, CVT scanning employs a scan head that is stationary. As a result, any contamination at the imaging point is converted into a streak unlike a platen scan where the contamination may only be reproduced as a single spot. The streak is, of course, an image quality defect that is much more visible than the spot as it extends across the entire image.

Figure 1:
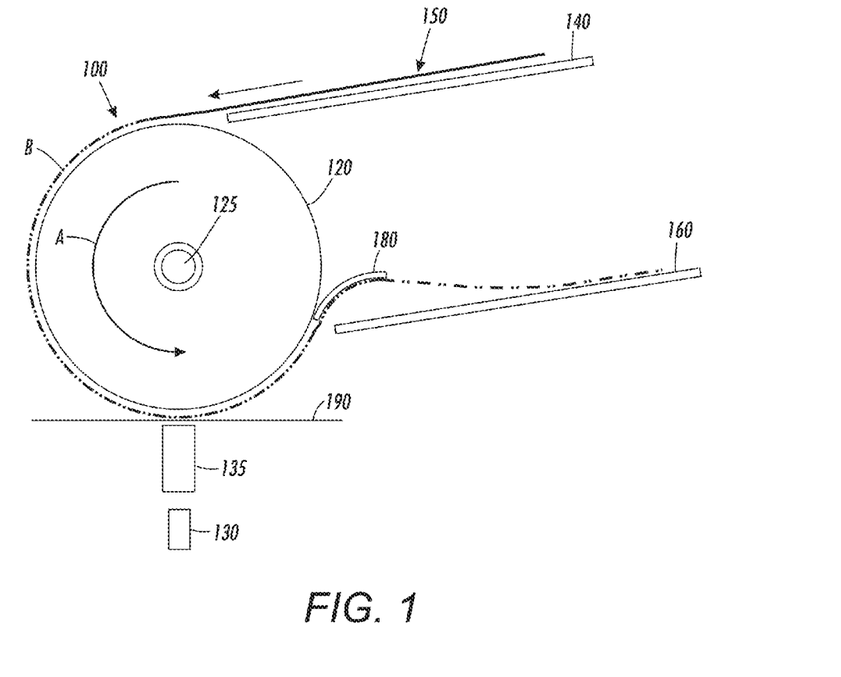
FIG. 1 illustrates an exemplary CVT scanning device 100 usable with various exemplary embodiments of the systems and methods according to this disclosure.

FIG. 1 illustrates an exemplary CVT scanning device 100 usable with various exemplary embodiments of the systems and methods according to this disclosure. As shown in FIG. 1, an exemplary embodiment of a CVT scanning device 100 may contains a constant velocity transport device 120, depicted in FIG. 1 as a drum, which moves at a constant velocity in direction A about a spindle 125. In embodiments, the CVT may be a belt-type transport device or a flat plate.

A feed tray 140 holds one or more image-bearing substrates 150 to be scanned. Image-bearing substrates 150 such as, for example, pages of paper containing text or other images, are individually presented to the constant velocity transport device 120, also referred to below as a "CVT drum 120," from the document feeder 140. The individual image-bearing substrate 150 to be scanned is transported by the CVT drum 120 along path B as the CVT drum 120 rotates in direction A. The individual image-bearing substrate 150 is scanned as it is moved across a platen glass 190 that lies between the CVT drum 120 and the imaging array 130, and often a focusing lens apparatus 135, which underlies the platen glass 190. The scanned image-bearing substrate 150 completes its travel by being peeled from the CVT drum 120 by a baffle device 180, and deposited in an output tray 160.

In various exemplary embodiments of the systems and methods according to this invention, the imaging array 130 scans, digitizes and records the images presented from the image-bearing substrate 150 focused through the lens apparatus 135. As an image-bearing substrate 150 is transported across the platen glass 190 or other transparent element by the CVT drum 120, the imaging array 130 takes a series of rapid, sequential scans of the image. Scanned image data is digitized through systems in the CVT scanning device 100 and stored and/or reproduced as an output image.

Often, obstruction detection is facilitated by the use of a very detailed test pattern that is designed to provide baseline calibration. Comparison of a scanned image of the intricate test pattern to stored image data regarding the intricate test pattern may reveal the presence of an obstruction based on an unexpected streak appearing in the scanned image data. A shortfall in conventional methodologies is that they may require significant processing overhead for the storing and comparing of the intricate test pattern data. Also, this method may not detect a streak that may be positioned to effectively blend with a single line in the intricate test pattern.

It would be advantageous in view of the above-described characteristics of conventional methods to provide a simple scheme for detecting obstructions by isolating streaks caused by those obstructions in scanned images that do not rely on the use of intricate test pattern image data.

Exemplary embodiments of the disclosed systems and methods may provide at manufacture, and/or in the field, a robust yet simple-to-implement scheme for obstruction detection that does not rely on any specialized test patterns and, therefore, may be more easily implemented in machine software without sacrificing significant processing overhead.

Exemplary embodiments may compare multiple passes of a simple test sheet passing the scanner in different orientations to detect streaks in the scanned images such that pixels may be substituted in the bit stream from the CCD or other sensor either at the incoming stream, or otherwise in the image path, to correct for detected streaks.

Exemplary embodiments may provide a robust method for detection of streaks caused by contamination, the contamination resulting in lighter or darker streaks in the image.

Exemplary embodiments may address a perceived shortfall resulting from circumstances and/or test and calibration protocols that use only a plain light sheet as correspondingly light streaks may be hard to detect.

Exemplary embodiments may effectively address instances where streaks can be fleeting, e.g., not present scan-to-scan, by ignoring such less consistent streaking.

Exemplary embodiments may provide a simple method which can be used in the field with no specialized patterns or equipment. The disclosed scheme allows streaks which may occur in use to be addressed throughout the life of the image forming device and/or components thereof.

Exemplary embodiments may address occasions in which specific detailed test patterns are not generally available and/or in which machine-produced test patterns may themselves have streaks otherwise and separately introduced by the print engine when test pattern data is printed on an image receiving medium substrate.

Exemplary embodiments may mitigate the presence of streaks on original scanned documents by feeding the image medium substrate being scanned past the scanner twice in two separate orientations, e.g., rotated or flipped. Streaks which are "visible" in a same place in both scans may be counted, while streaks which are found positioned in different places in separate scans may be deemed to be on the original and may not be counted.

Exemplary embodiments may detect streaks of different levels on a combined plain light sheet and a dark sheet simply produced by an image marking engine. The dark sheet may be, for example, printed in an image forming device as a full area fill. The combined sheet media may be fed past the scanner a first time to establish one set of scanned image data and may be fed past the scanner a second time after having been rotated or flipped with regard to the orientation the first time. A comparison of the multiple scans may be used to eliminate media streaks.

Exemplary embodiments may perform normal streak analysis by creating a table of detected streaks for a particular scanner or family of scanners. The information in the created table of the detected streaks for the particular scanner or family of scanners may be compared and updated with following scan information from each set of multiple scans. This is a specific departure from conventional schemes in which typically all previous streaks are erased from memory and only new ones are accounted for. Both methodologies are allowed, however.

Exemplary embodiments may provide some metric for determination of presence of a streak. Exemplary embodiments may employ illustrative values, which may be, for example, multiple grey levels above the average for 80% (light) paper and others for dark paper. Typically, streaks are visible 1 or 2% above or below the nominal background value. The streaks may be detected as a perturbation from the average or a continuous disturbance throughout the image at a pixel location or other combinations.

Exemplary embodiments of the disclosed process may be run at any time, e.g., at manufacture, regularly in use by a customer, or by user/customer initiation only when a streak is perceptibly detected in output image products.

Exemplary embodiments may set thresholds for the numbers or widths of streaks by which to determine if they are removed or if a lower quality image production mode is entered and the customer service personnel are called for machine cleaning and/or recalibration.

Exemplary embodiments may further compact the process by printing a dark strip as opposed to a complete dark sheet. In embodiments, this may enable the user to scan a single sheet that includes both a light stripe and a dark stripe. Thus, only two scans may be required.

Exemplary embodiments may have the further advantage that, if the image is rotated and scanned again, the order of the light stripe and the dark stripe may be reversed and hence it is possible for the analysis software to be more robust in detecting the rotation.

Exemplary embodiments may provide stripes that are sufficiently wide to allow enough averaging of scan lines to reduce any image noise and hence provide more robust detection of visible streaks. In exemplary embodiments, the streak location information may be encoded as a start pixel and a length of replication for use in the streak removal process where numerous algorithms may be used. A simplest of these algorithms may be, for example, replication of neighboring pixels to replace the pixels determined as defective.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for implementing a simple scheme of intelligent streak detection in constant velocity transport (CVT) image array scanning devices will be described, in detail, with reference to the following drawings, in which.

DETAILED DESCRIPTION OF THE DISCLOSED EMBODIMENTS

The systems and methods for implementing a simple scheme of intelligent streak detection in constant velocity transport (CVT) image array scanning devices according to this disclosure will generally refer to this specific utility or function for those systems and methods. Exemplary embodiments described and depicted in this disclosure should not be interpreted as being specifically limited to any particular configuration of the described elements, or as being specifically directed to any particular intended use. Any advantageous use of internal comparisons of a same scanned image taken according to different orientations of the same scanned image to identify image defects introduced in the scanning process is contemplated as being included in this disclosure.

Specific reference to, for example, conventional image forming devices, scanning devices, simple test patterns or image correction algorithms should not be considered as, in any way, limiting to any specific configurations for the devices or other components, or as being limited to only those devices. Exemplary embodiments as depicted and described throughout this disclosure are intended to refer globally to image forming devices and image scanning systems that carry out a wide array of image forming, image producing, image reproducing or image transmitting operations, as those operations would be understood, in a broadest context, by those of skill in the art.

Figure 2:
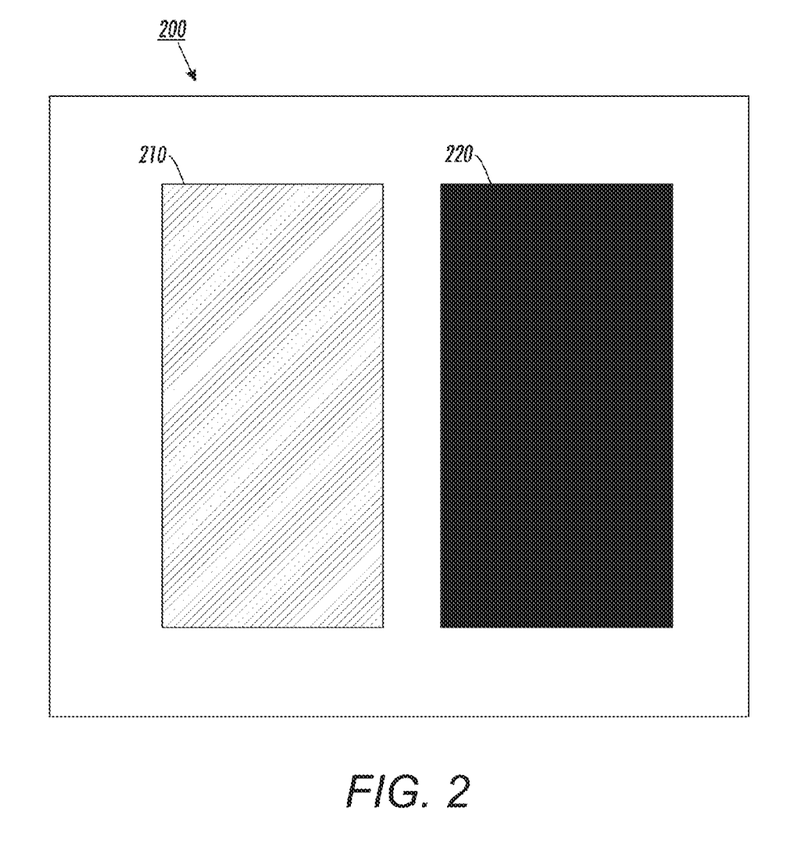
FIG. 2 illustrates a first exemplary embodiment of a basic test pattern that may be usable for streak detection according to the disclosed schemes.

FIG. 2 illustrates a first exemplary embodiment 200 of a basic test pattern disposed on an image receiving medium substrate that may be usable for streak detection according to the disclosed schemes. As shown in FIG. 2, at least two test image areas 210,220 may be disposed on the image receiving medium substrate. The two test image areas 210,220 may include a plain or light sheet image area 210 and a dark sheet image area 220 that may be simply produced on the image receiving medium substrate by an image marking engine. The dark sheet image area 220 may be, for example, printed in an image forming device as a full area fill. The two image test areas 210,220 may be laterally displaced in order that a 180° flip or rotation may swap the apparent scanned positions of the two image test areas 210,220 as presented to the image scanning system.

Figure 3:
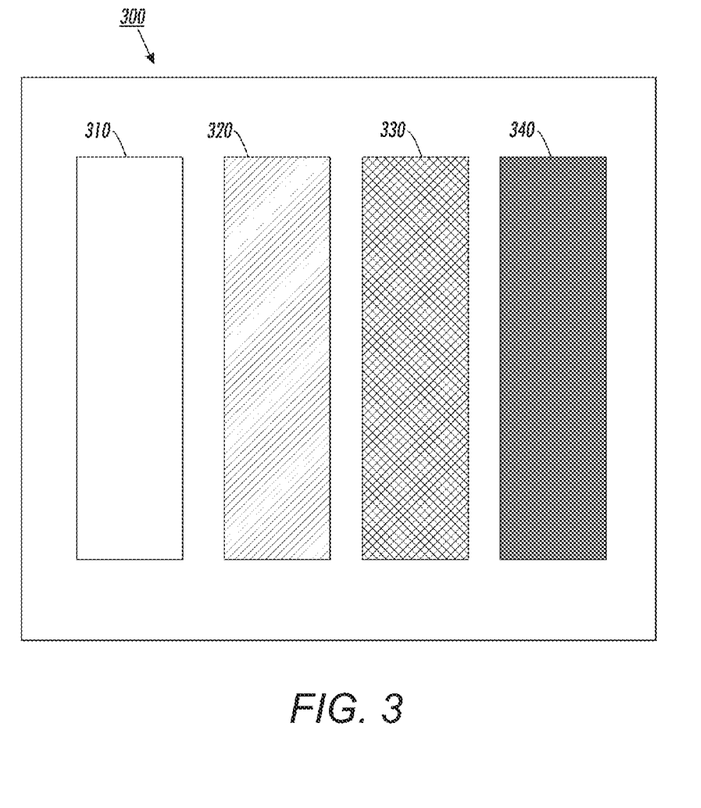
FIG. 3 illustrates a second exemplary embodiment of a basic test pattern that may be usable for streak detection according to the disclosed schemes.

FIG. 3 illustrates a second exemplary embodiment 300 of a basic test pattern disposed on an image receiving medium that may be usable for streak detection according to the disclosed schemes. As shown in FIG. 3, a plurality of laterally-displaced image test areas 310-340 may be disposed on the image receiving medium substrate. The plurality of laterally-displaced image test areas 310-340 may include a number of different discernible patterns and/or grey levels that may be simply produced on the image receiving medium substrate by an image marking engine. The lateral displacement of the plurality of laterally-displaced image test areas 310-340 may provide that a 180° flip or rotation may swap the apparent scanned positions of the plurality of laterally-displaced image test areas as presented to the image scanning system. The plurality of laterally-displaced image test areas 310-340 may be comprised of a wide array of individual test stripes to support the multiple scan and comparison schemes according to this disclosure.

Figure 4:
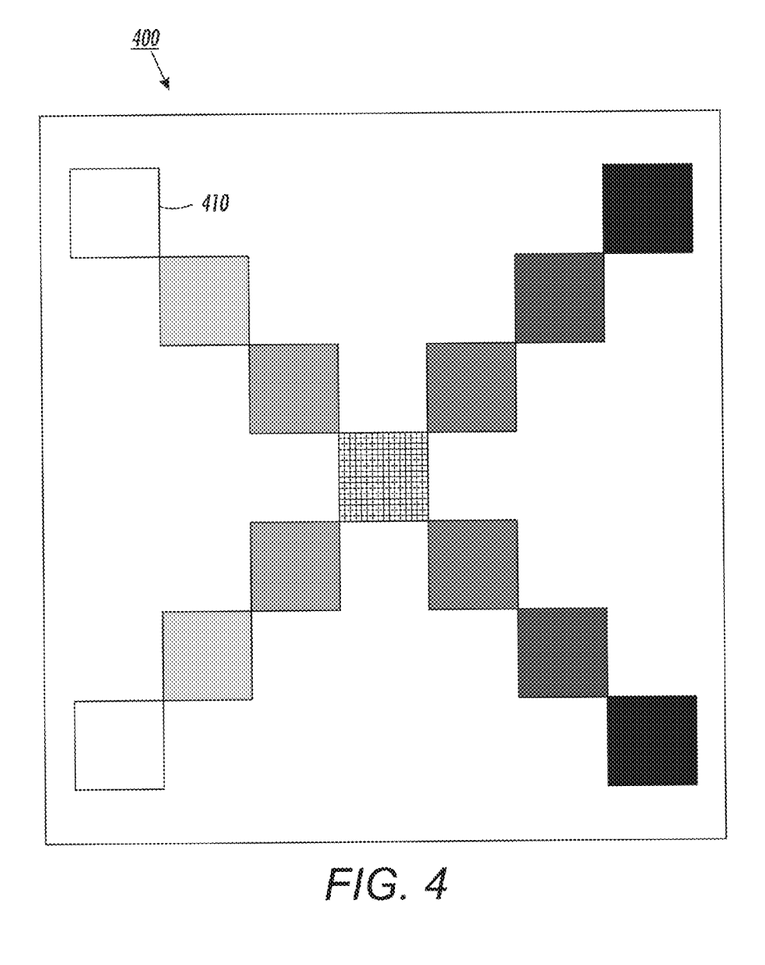
FIG. 4 illustrates a third exemplary embodiment of a basic test pattern that may be usable for streak detection according to the disclosed schemes.

FIG. 4 illustrates a third exemplary embodiment 400 of a basic test pattern disposed on an image receiving medium that may be usable for streak detection according to the disclosed schemes. As shown in FIG. 4, virtually any configuration of a simply-configured image test area 410 that is laterally differentiable with lighter and darker test area portions may be usable with the disclosed schemes. An objective is that the test patterns be simple to produce and interpret in order that streaks which may be produced in the marking of the test patterns on an image receiving medium substrate may be easily interpreted and discounted in the scanning process. In other words, streaks introduced in the process of forming the test pattern on the image receiving medium substrate will not affect the disclosed schemes in that the internal comparison on the scanned images of separate orientations of the test pattern will be able to detect and discount the produced streaking.

Figure 5:
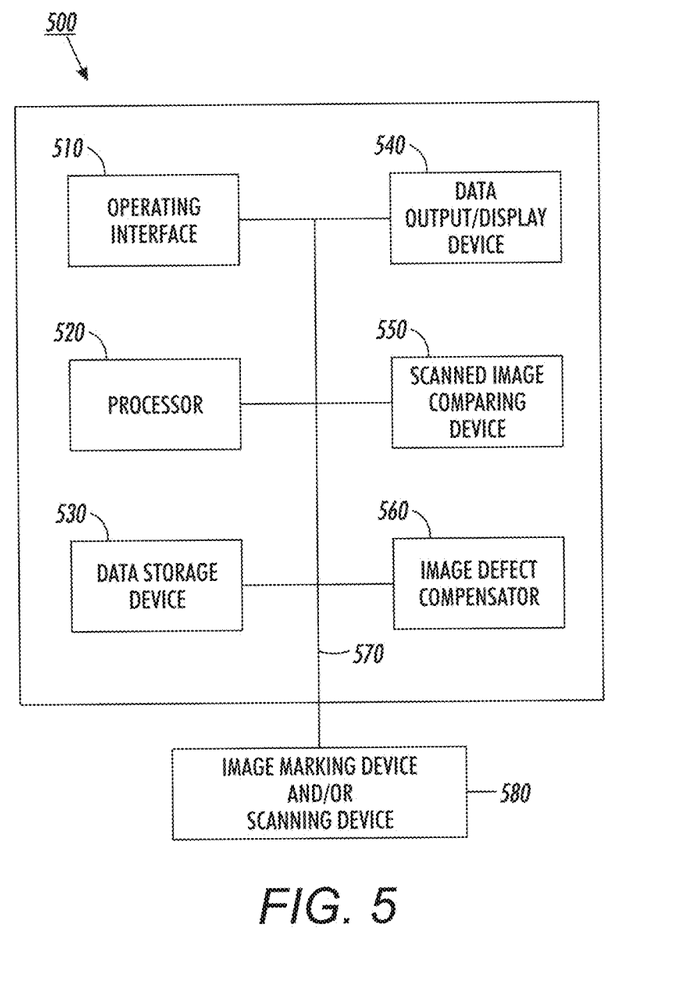
FIG. 5 illustrates a block diagram of an exemplary control system for implementing intelligent streak detection according to this disclosure.

FIG. 5 illustrates a block diagram of an exemplary control system 500 for implementing an intelligent streak detection scheme according to this disclosure. As shown in FIG. 5, the exemplary control system 500 operates in wired or wireless communication with an image marking device and/or image scanning system 580, which may be separate devices or systems, or separate components of, for example, a multi-function device (MFD). The MFD may include some or all of functions and components for image forming, image scanning, and image transmission of conventional-type copying, scanning, faxing and the like. The exemplary control system 500 may be a component system within the one or more of the image making device and/or image scanning system 580, or may be a separate control component housed in, for example, a user's desktop workstation or portable wireless computing or communicating device for externally or remotely controlling operation of the image marking device and/or image scanning system 580 to effect the disclosed streak detection schemes.

The exemplary control system 500 may include an operating interface 510 by which a user may communicate with the exemplary control system 500. The operating interface 510 may be a locally accessible user interface associated with an image forming device or an image scanning system. The operating interface 510 may be configured as one or more conventional mechanisms common to control devices and/or computing devices that may permit a user to input information to the exemplary control system 500. The operating interface 510 may include, for example, a conventional keyboard, a touchscreen with "soft" buttons or with various components for use with a compatible stylus, a microphone by which a user may provide oral commands to the exemplary control system 500 to be "translated" by a voice recognition program, or other like device by which a user may communicate specific operating instructions to the exemplary control system 500. The operating interface 510 may be a part of a function of a graphical user interface (GUI) mounted on, integral to, or associated with, the image forming device and/or image scanning system 580 with which the exemplary control system 500 is associated.

The exemplary control system 500 may include one or more local processors 520 for individually operating the exemplary control system 500 and for carrying out operating functions of the intelligent streak detection methodology in the image forming device and/or image scanning system 580 with which the exemplary control system 500 may be associated. Processor(s) 520 may include at least one conventional processor or microprocessor that interprets and executes instructions to direct specific functioning of the exemplary control system 500 and potentially of the image marking device and/or image scanning system 580.

The exemplary control system 500 may include one or more data storage devices 530. Such data storage device(s) 530 may be used to store data or operating programs to be used by the exemplary control system 500, and specifically the processor(s) 520. Data storage device(s) 530 may be used to store information regarding individual streak detection and test pattern comparison schemes. Data storage device(s) 530 may also be used to store one or more algorithms that may be used to apply corrections to information derived from an image scanning system when streaks are detected according to the disclosed schemes. Image quality improvement and streak removal algorithms are known and this disclosure is not intended to limit the scope of any potential streak correction algorithm that may be applied to image data when streaks are detected and may be verified according to the disclosed methods. The stored schemes for streak detection may provide comparison between image information derived from multiple scans of a test pattern that is presented to the scanner in multiple orientations for comparison according to the disclosed schemes.

The data storage device(s) 530 may include a random access memory (RAM) or another type of dynamic storage device that is capable of storing updatable database information, and for separately storing instructions for execution of system operations by, for example, processor(s) 520. Data storage device(s) 530 may also include a read-only memory (ROM), which may include a conventional ROM device or another type of static storage device that stores static information and instructions for processor(s) 520. Further, the data storage device(s) 530 may be integral to the exemplary control system 500, or may be provided external to, and in wired or wireless communication with, the exemplary control system 500.

The exemplary control system 500 may include at least one data output/display device 540, which may be configured as one or more conventional mechanisms that output information to a user, including, but not limited to, a display screen on a GUI of the image forming device and/or image scanning system 580 with which the exemplary control system 500 may be associated. The data output/display device 540 may be used to indicate to a user a status of image comparison for multiple scanned images for streak detection.

The exemplary control system 500 may include a scanned image comparing device 550. The scanned image comparing device 550 may be operative, for example, in a test and/or calibration mode for the image forming device and/or image scanning system 580. The scanned image comparing device 550 may include a capacity to store information from a first scan of a test pattern in an image scanning system for comparison to a second scan of the same test pattern in a different orientation by the image scanning system. The scanned image comparing device 550 may normalize the separate scans of the same test pattern in different orientations to isolate image articles that are recognized as streaks. The scanned image comparing device 550 may be associated with an operating scheme for the image forming device and/or image scanning system 580. The scanned image comparing device 550 may operate as a part of a processor 520 coupled to, for example, one or more data storage devices 530, or as a separate stand-alone component module or circuit in the exemplary control system 500. The scanned image comparing device 550 may provide input to the exemplary control system 500 to send a signal to the data output/display device 540 to advise a user that a streak has been identified. Additionally, or separately, the scanned image comparing device 550 may send a signal to activate a scheme to provide image defect compensation in an image defect compensator 560 according to the discussion above and below.

The exemplary control system 500 may include an image defect compensator 560. The image defect compensator 560 may receive a signal from the scanned image comparing device 550 to effect a conventional image defect compensation scheme according to known methods in the exemplary control system 500. The image defect compensator 560 may operate as a part of a processor 520 coupled to, for example, one or more data storage devices 530, or as a separate stand-alone component module or circuit in the exemplary control system 500.

All of the various components of the exemplary control system 500, as depicted in FIG. 5, may be connected internally, and to the image forming device and/or image scanning system 580 by one or more data/control busses 570. These data/control busses 570 may provide wired or wireless communication between the various components of the exemplary control system 500, whether all of those components are housed integrally in, or are otherwise external and connected to the image forming device and/or image scanning system 580 with which the exemplary control system 500 may be associated.

It should be appreciated that, although depicted in FIG. 5 as an integral unit, the various disclosed elements of the exemplary control system 500 may be arranged in any combination of sub-systems as individual components or combinations of components, integral to a single unit, or external to, and in wired or wireless communication with the single unit of the exemplary control system 500. In other words, no specific configuration as an integral unit or as a support unit is to be implied by the depiction in FIG. 5. Further, although depicted as individual units for ease of understanding of the details provided in this disclosure regarding the exemplary control system 500, it should be understood that the described functions of any of the individually-depicted components may be undertaken, for example, by one or more processors 520 connected to, and in communication with, one or more data storage device(s) 530.

Figure 6:
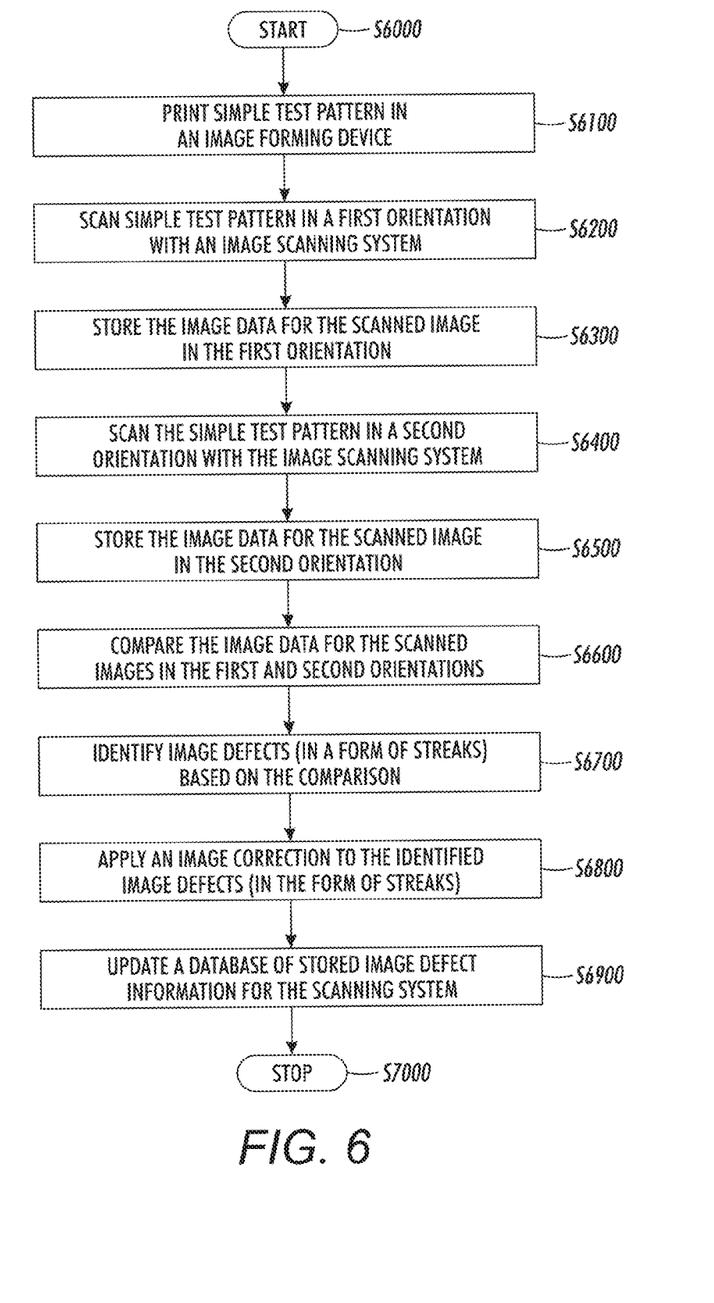
FIG. 6 illustrates a flowchart of an exemplary method for implementing intelligent streak detection according to this disclosure.

The disclosed embodiments may include a method for implementing intelligent streak detection in an image scanning system. FIG. 6 illustrates a flowchart of such an exemplary method according to this disclosure. As shown in FIG. 6, operation of the method commences at Step S6000 and proceeds to Step S6100.

In Step S6100, an image forming device may be operated or commanded to print a simple test pattern on an image receiving medium substrate. The simple test pattern may be stored in one or more data storage units associated with the image forming device. In embodiments, the simple test pattern may include a plain light area and a dark area in order that, according to the disclosed schemes, streaks presented as light colored streaks or separately as dark colored streaks may be separately detected on one or the other of the areas associated with the simple test pattern. Operation of the method proceeds to Step S6200.

In Step S6200, the image receiving medium substrate with the simple test pattern recorded there on may be passed to an input of an image scanning system, particularly a CVT image scanning system, in a first orientation. The image scanning system may be operated to scan the simple test pattern in the first orientation. Operation of the method proceeds to Step S6300.

In Step S6300, image data that represents the scanned image of the simple test pattern in the first orientation may be stored in a temporary data storage location. Operation of the method proceeds to Step S6400.

In Step S6400, the image receiving medium substrate with the simple test pattern recorded thereon may be recovered from an output of the image scanning system, physically rotated or flipped and passed to the input of the image scanning system in a second orientation. The image scanning system may be operated again to scan the simple test pattern in the second orientation. Operation of the method proceeds to Step S6500.

In Step S6500, image data that represents the scanned image of the simple test pattern in the second orientation may be stored in the temporary data storage location. Operation of the method proceeds to Step S6600.

In Step S6600, the image data for the scanned images in the first and second orientations may be compared to each other with an objective of perceiving any image defects introduced by the scanning process in the image scanning system. In each instance, the scanned image data may be machine rotated and compared to uncover any individual defects that are introduced by the multiple scans of the same test patter. Operation of the method proceeds to Step S6700.

In Step S6700, image defects, particularly those that are presented in the form of streaks, may be identified for further processing. This step is intended to not only isolate the image quality defects, but also may afford the scheme an opportunity to discard transient defects. Operation of the method proceeds to Step S6800.

In Step S6800, an image correction scheme according to known techniques may be applied to correct image data to remove the image quality defects, including streaks, introduced by the scanning process. Operation of the method proceeds to Step S6900, In Step S6900, information regarding the identified image defects and/or the applied corrections may be stored in an updateable database in, for example, a data storage device associated with the image scanning system. In this manner, accumulated defects and defect corrections may be accounted for and used as part of a process for improving image quality with respect to scanned images. The accumulated data may also be usable to specify that a predetermined, or user-selectable, threshold, for example, for a number and/or type of determined and corrected defects has been exceeded. Based on such a determination, a control or computing system that may be associated with the image scanning system may alert a user to a need for additional action to be taken in order to preserve image quality in the image scanning system. This additional action may include instructing a user to execute a manual or automated cleaning routine with regard to one of more of the physical or electronic components in the image scanning system. Alternatively, the additional action may separately include directing the user that a service call by, for example, a manufacturer's or supplier's customer service technical representatives may be required to clean, replace or recalibrate imaging components in the image scanning system to correct the accumulated image quality issues in the image scanning system. Operation of the method proceeds to Step S7000, where operation of the method ceases.

The disclosed embodiments may include a non-transitory computer readable medium on which is recorded instructions for executing an intelligent streak detection scheme, as described above.

The above-described exemplary systems and methods reference certain conventional components to provide a brief, general description of suitable image forming means, image scanning means, control means and image quality correction means by which to carry out the disclosed streak detection techniques in support of preserving or enhancing image quality in an image scanning system. These references are intended to be illustrative of the system components and image forming environments in which the disclosed schemes may be advantageously employed and are not intended to introduce limitations into the disclosed schemes. Those skilled in the art will appreciate that other embodiments of the disclosed subject matter may be practiced with many types of imaging elements common to image scanning systems in many different configurations.

The exemplary depicted sequence of executable instructions represents one example of a corresponding sequence of acts for implementing the functions described in the steps. The exemplary depicted steps may be executed in any reasonable order to carry into effect the objectives of the disclosed embodiments. No particular order to the disclosed steps of the method is necessarily implied by the depiction in FIG. 6, and the accompanying description, except where a particular method step is a necessary precondition to execution of any other method step. Individual method steps may be carried out in sequence or in parallel in simultaneous or near simultaneous timing.

Although the above description may contain specific details, they should not be construed as limiting the claims in any way. Other configurations of the described embodiments of the disclosed systems and methods are part of the scope of this disclosure.

It will be appreciated that a variety of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

I claim:

1. A method for controlling an imaging system, comprising:
    forming a test pattern image on an image receiving media substrate, the test pattern image consisting of at least two laterally-displaced test areas, at least a first test area being a plain white test area and at least a second test area being a dark test area;
    first scanning the test pattern image formed on the image receiving media substrate with a scanning device, the image receiving media substrate being exposed to the scanning device in a first physical orientation;
    storing first information from the first scanning in a memory;
    physically reorienting the image receiving media substrate with the test pattern formed thereon to a second physical orientation that is different from the first physical orientation;
    second scanning the test pattern image formed on the image receiving media substrate with the scanning device, the image receiving media substrate being exposed to the scanning device in the second physical orientation;
    storing second information from the second scanning in the memory; and
    comparing, with a processor, the first stored information from the first scanning and the second stored information from the second scanning to isolate at least one image quality defect in the twice scanned test pattern image.

2. The method of claim 1, further comprising applying an image defect correcting algorithm to the at least one image quality defect isolated in the comparing.

3. The method of claim 1, the at least one image quality defect isolated in the comparing being in a form of a streak.

4. The method of claim 1, the processor normalizing the first information from the first scanning and the second information from the second scanning prior to conducting the comparing.

5. The method of claim 1, the image receiving medium media substrate being introduced to an input of the scanning device in the first physical orientation by a user.

6. The method of claim 5, the image receiving media substrate being moved across a stationary imaging array in the scanning device for the first scanning by operation of a constant velocity transport component of the scanning device.

7. The method of claim 6, the image receiving media substrate being recovered from an output of the scanning device, physically reoriented, and reintroduced to the input of the scanning device in the second physical orientation by the user.

8. The method of claim 1, the test pattern image formed on the image receiving media substrate comprising at least three laterally-displaced striped test areas, each of the three laterally displaced striped areas being of a different grey scale level.

9. The method of claim 1, further comprising storing information on the at least one image quality defect isolated in the comparing in an updateable database.

10. The method of claim 9, further comprising:
determining when an accumulation of image quality defects isolated in a series of comparings in the scanning device exceeds a threshold; and
advising a user that additional action is appropriate to address the accumulation of isolated image quality defects.

11. An image scanning system, comprising:
a substrate input device that is configured to receive image receiving media substrates on which test pattern images are formed;
a scanning array downstream of the substrate input device in a process direction that scans the test pattern images formed on the image receiving media substrates presented to the scanning array;
a substrate output device that is positioned downstream of the scanning array in a process direction and is configured to receive the image receiving media substrates after the image receiving media substrates pass the scanning array;
a data storage memory that temporarily stores information regarding the test pattern images scanned from the image receiving media substrates;
a scanned image comparing device that compares first stored information from a first scanned image with second stored information from a second scanned image to isolate at least one image quality defect, the first scanned image being of a particular test pattern formed on an image receiving media substrate, the image receiving media substrate being presented to the scanning array in a first physical orientation and the second scanned image being the same test pattern image formed on the same image receiving media substrate, the same image receiving media substrate being physically reoriented and presented to the scanning array in a second physical orientation for the image receiving media substrate that is different from the first physical orientation; and
a data output device that outputs information on the at least one image quality defect isolated by the comparing in the scanned image comparing device.

12. The system of claim 11, further comprising an image defect compensator that applies an image defect correcting algorithm to the at least one image quality defect isolated by the comparing in the scanned image comparing device.

13. The system of claim 11, the scanned image comparing device isolating the at least one image quality defect in a form of a streak.

14. The system of claim 11, the scanned image comparing device normalizing information from the first scanned image and information from the second scanned image prior to performing the comparing of the first scanned image and the second scanned image to isolate the at least one image quality defect.

15. The system of claim 11, the same image receiving media substrate being introduced via the substrate input device in the first physical orientation by a user, and recovered from the substrate output device after a first scanning, physically reoriented, and reintroduced to the substrate input device in the second physical orientation by the user.

16. The system of claim 11, the scanning array being stationary and the image receiving media substrate being moved across the stationary scanning array by a constant velocity media transport device separately for the first scanned image and the second scanned image.

17. The system of claim 11, further comprising a database storage device storing information on the at least one image quality defect isolated by the comparing in the scanned image comparing device in an updateable database,
the scanned image comparing device determining when an accumulation of image quality defects for the system exceeds a threshold, and sending information to a user via the data output device advising the user that additional action is appropriate to address the accumulation of image quality defects.

18. A non-transitory data storage medium on which is recorded instructions which, when executed by a processor, will cause the processor to execute the steps of a method for controlling an imaging system, comprising:
forming a test pattern image on an image receiving media substrate, the test pattern image formed on the image receiving media substrate consisting of at least two laterally-displaced test areas, at least a first test area being a plain white test area and at least a second test area being a dark test area;
first scanning the test pattern image formed on the image receiving media substrate with a separate scanning device, the image receiving media substrate being exposed to the separate scanning device in a first physical orientation;
storing first information from the first scanning in a data storage device;
physically reorienting the image receiving media substrate with the test pattern image formed thereon to a second physical orientation that is different from the first physical orientation;
second scanning the test pattern image formed on the image receiving media substrate with the separate scanning device, the image receiving media substrate being exposed to the separate scanning device in the second physical orientation;
storing second information from the second scanning in the data storage device;
comparing the stored first information for the first scanning with the stored second information for the second scanning to isolate at least one image quality defect in the twice scanned test pattern image; and
applying an image defect correcting algorithm to the at least one image quality defect isolated in the comparing;
the at least one image quality defect isolated in the comparing being in the form of a streak.

* * * * *